(12) United States Patent
Reid (10) Patent No.: US 10,351,457 B2
(45) Date of Patent: Jul. 16, 2019

(54) DUAL RETURN ACTIVATED SLUDGE PROCESS IN A FLOW-EQUALIZED WASTEWATER TREATMENT SYSTEM

(71) Applicant: John H. Reid, Fredericksburg, VA (US)

(72) Inventor: John H. Reid, Fredericksburg, VA (US)

(*) Notice: Subject to any disclaimer, the term of this patent is extended or adjusted under 35 U.S.C. 154(b) by 0 days.

(21) Appl. No.: 15/601,678

(22) Filed: May 22, 2017

(65) Prior Publication Data

US 2017/0253515 A1   Sep. 7, 2017

Related U.S. Application Data

(63) Continuation-in-part of application No. 14/642,369, filed on Mar. 9, 2015, now Pat. No. 9,656,897, which is a continuation-in-part of application No. 14/593,508, filed on Jan. 9, 2015, now Pat. No. 9,567,248.

(51) Int. Cl.
| | |
|---|---|
| C02F 11/04 | (2006.01) |
| C02F 3/30 | (2006.01) |
| C02F 3/22 | (2006.01) |

(52) U.S. Cl.
CPC ............ *C02F 11/04* (2013.01); *C02F 3/22* (2013.01); *C02F 3/307* (2013.01); *C02F 3/303* (2013.01); *C02F 2209/10* (2013.01); *C02F 2209/40* (2013.01); *C02F 2301/043* (2013.01); *Y02W 10/15* (2015.05)

(58) Field of Classification Search
CPC .. C02F 11/04; C02F 3/307; C02F 3/22; C02F 2209/10; C02F 2301/043; C02F 3/303; C02F 2209/40; Y02W 10/15

USPC ................... 210/605, 623, 630, 903
See application file for complete search history.

(56) References Cited

U.S. PATENT DOCUMENTS

| | | | |
|---|---|---|---|
| 7,169,306 B1 | 1/2007 | Porteous et al. | |
| 7,722,768 B2 | 5/2010 | Abma et al. | |
| 8,574,885 B2 | 11/2013 | Vanotti et al. | |
| 2002/0074287 A1 | 6/2002 | Park et al. | |
| 2005/0061737 A1* | 3/2005 | Linden | A01K 63/04 |
| | | | 210/602 |
| 2006/0086662 A1 | 4/2006 | Ogden | |
| 2011/0120945 A1* | 5/2011 | Kaya | B01F 3/0865 |
| | | | 210/630 |
| 2013/0126428 A1 | 5/2013 | Jones et al. | |
| 2013/0213883 A1 | 8/2013 | Josse et al. | |
| 2013/0327710 A1 | 12/2013 | Reid | |

(Continued)

*Primary Examiner* — Fred Prince
(74) *Attorney, Agent, or Firm* — Walter Ottesen, P.A.

(57) ABSTRACT

A common final clarifier is provided downstream of a two-stage or three-stage activated sludge (AS) system that includes: (A) one or more flow equalization basin (FEB) reactors and a nitritation reactor as the first AS stage, and an anammox reactor as the second AS stage, or (B) a carbonaceous biological oxygen demand (BOD) removal reactor and one or more FEBs as the first AS stage, a nitritation reactor as the second AS stage, and an anammox reactor as the third AS stage. A first return activated sludge (RAS) flow is conducted from the final clarifier to the first AS stage and a second segregated RAS flow is conducted to the second AS stage. Alternatively, a third segregated RAS flow is conducted to the third AS stage.

34 Claims, 7 Drawing Sheets

(56) References Cited

U.S. PATENT DOCUMENTS

2014/0217019 A1 8/2014 Mehta et al.
2014/0238931 A1 8/2014 DiMassimo et al.

* cited by examiner

DUAL RETURN ACTIVATED SLUDGE PROCESS IN A FLOW-EQUALIZED WASTEWATER TREATMENT SYSTEM

CROSS REFERENCE TO RELATED APPLICATION

This application is a continuation-in-part of U.S. patent application Ser. No. 14/642,3691, filed on Mar. 9, 2015, which, in turn, is a continuation-in-part of U.S. patent application Ser. No. 14/593,508, filed Jan. 9, 2015, the entire contents of which are incorporated herein by reference.

FIELD OF THE DISCLOSURE

A two-stage activated sludge (AS) wastewater treatment system is disclosed in which the first stage includes one or more flow equalization basin (FEB) reactors and a nitritation reactor and the second stage includes an anammox reactor. The one or more FEB reactors provide flow equalization of the wastewater or sewage influent. A common final clarifier is arranged downstream of the second AS stage. The FEB reactor is operated as an anoxic reactor to achieve carbonaceous BOD removal; conversion of organic nitrogen to ammonia nitrogen; and, denitrification of recycled nitrite or nitrate nitrogen. The nitritation reactor is operated as an aerobic reactor to achieve oxidation of ammonia nitrogen to nitrite nitrogen by biological nitritation. The anammox reactor is operated at zero or very low dissolved oxygen concentration to achieve nitrogen removal by deammonification.

Also disclosed is a process for treating wastewater or sewage comprising a two-stage AS wastewater treatment system that involves several steps. In a first step, the system receives a wastewater inflow or a sewage inflow in a first Reactor. In a second step the system receives an outflow from the first reactor to one or more second reactors. In a third step, the system receives an outflow from the one or more second reactors in a nitritation reactor. In a fourth step, the system receives an overflow of partially treated wastewater or partially treated sewage from the nitritation reactor in an anammox reactor. In a fifth step, the system receives a bypass flow from the first reactor and/or the one or more second reactors in the anammox reactor. In a sixth step, the system receives a mixed liquor flow from the anammox reactor in a clarifier. The system also provides a first return activated sludge flow from the clarifier to the first reactor, a second return activated sludge from the clarifier to the nitritation reactor, and a third return activated sludge flow from the clarifier to the anammox reactor.

In the two-stage system, the first reactor and the one or more second flow equalization reactors are each separated by a partition wall. Further, the partition wall(s) comprise one or more openings providing fluid communication therethrough.

In another embodiment, the system can receive the mixed liquor flow from the anammox reactor in a plurality of clarifiers connected in parallel.

In another embodiment, the system can blend the overflow from the nitritation reactor and the bypass flow from the first flow reactor in the anammox reactor. In one embodiment of the system, the mean cell residence time (MCRT) of the first reactor, the one or more second reactors, the nitritation reactor, or the one or more second reactors and the nitritation reactor, to be of from 2 to 5 days.

In another embodiment, the MCRT of the anammox reactor in the system is adjusted to be at least 40 days. Alternatively, the MCRT of the anammox reactor in the system is adjusted to be at least 50 days.

The system also can receive the outflow from the first reactor or the one or more second reactors in the nitritation reactor with an average flow rate of from 40% to 50% of an average daily feed forward flow rate. In such an embodiment, the average daily flow rate of the outflow is about 45% of the average daily feed forward flow rate.

In a further embodiment of the system, the system can include receiving the bypass flow from the first reactor in the anammox reactor with an average flow rate of from 50% to 60% of an average daily feed forward flow rate. In such an embodiment, the average daily flow rate of the bypass flow can be 55% of the average daily feed forward flow rate.

In a further embodiment, the system can operate the equalization reactor with a dissolved oxygen concentration of approximately 0.0 mg/L to 0.50 mg/L and/or the nitritation reactor with a dissolved oxygen concentration of approximately 0.10 mg/L to 0.50 mg/L and/or the anammox reactor with a dissolved oxygen concentration of approximately 0.0 mg/L to 0.10 mg/L.

The system can also comprise at least one polishing reactor between the anammox reactor and the clarifier. In this embodiment, a plurality of polishing reactors can be provided connected in series. Also in such an embodiment, the at least one polishing reactor can act to remove residual ammonia from the mixed liquor flow by nitrification where the at least one polishing reactor removes residual nitrite and nitrate nitrogen from the mixed liquor flow by denitrification.

In another embodiment of the system, a flow rate of the second return activated sludge flow can be greater than a flow rate of the first return activated sludge flow, and/or the flow rate of the third return activated sludge can be greater than the second return activated sludge flow.

In another embodiment, a concentration of mixed liquor suspended solids (MLSS) in the first reactor, or the one or more second reactor(s), the nitritation reactor or in the first reactor and the nitritation reactor can be of from 500 mg/L to 2,500 mg/L and/or a concentration of mixed liquor suspended solids (MLSS) in the anammox reactor is of from 2,000 mg/L to 10,000 mg/L.

In some embodiments, 45% of the sum of the wastewater inflow and return activated sludge inflow into the first reactor can be pumped out of the first reactor into the anammox reactor, and/or 55% of the sum total of the wastewater inflow and return activated sludge inflow into the first reactor can be received by the one or more second reactors by gravity through the one or more openings in the partition wall(s).

In other embodiments of the system, the system can receive an inflow to the nitritation reactor from one or more second reactors. In such an embodiment, the sum total of the inflow from the first reactor and the nitritation reactor to the one or more second reactor(s) can flow by gravity from the one or more second reactor(s) at a constant rate of 55% into the nitritation reactor. Such embodiments can also include a recycle flow rate from the nitritation reactor into the one or more second reactor(s) ranging from zero to four times the wastewater inflow to the first reactor and/or the concentration of MLSS in the first reactor is 500 to 1500 mg/L, and/or the concentration of MLSS in the one or more second flow equalization reactors is 1000 to 2500 mg/L.

In other embodiments, the first reactor can be an equalization reactor or a carbonaceous biological oxygen demand (BOD) removal reactor. In yet further embodiments, when the one or more second reactors are one or more flow equalization reactors, then the first reactor cannot be a flow equalization reactor, and/or when the first reactor is a flow equalization reactor, then the one or more second reactors can be one or more flow equalization reactors.

Also provided is a process for treating wastewater or sewage that comprises various steps, including receiving a wastewater inflow or a sewage inflow in a first carbonaceous biological oxygen demand (BOD) removal reactor, receiving an outflow from the first carbonaceous BOD removal reactor to one or more second carbonaceous BOD removal reactors, receiving an outflow from the one or more second carbonaceous BOD removal reactors in a nitritation reactor, receiving an overflow of partially treated wastewater or partially treated sewage from the nitritation reactor in an anammox reactor, receiving a bypass flow from the first carbonaceous BOD removal reactor and/or the one or more second carbonaceous BOD removal reactors in the anammox reactor, and/or receiving a mixed liquor flow from the anammox reactor in a clarifier.

In such embodiments, the system can be provided with a first return activated sludge flow from the clarifier to the first flow carbonaceous BOD removal reactor, and/or a second return activated sludge from the clarifier to the nitritation reactor, and/or a third return activated sludge flow from the clarifier to the anammox reactor. In such embodiments, the first carbonaceous BOD removal reactor and the one or more second carbonaceous BOD removal reactors can each be separated by a partition wall, and/or the partition wall(s) can comprise one or more openings providing fluid communication t-herethrough.

Such systems can further include steps such as receiving a nitrate recycle flow (NRF) from the nitritation reactor to the one or more second carbonaceous BOD removal reactors. In these embodiments, the first and the one or more second carbonaceous BOD removal reactors can function as a split first stage carbonaceous BOD removal reactor.

Also in these and other embodiments, a rate of flow of discharge from the first carbonaceous BOD removal reactor to the one or more second carbonaceous BOD removal reactor(s) can be a sum total of: (a) up to 55% of a combined rate of flow of the wastewater inflow and a rate of flow of the first return activated sludge flow from the clarifier to the first carbonaceous BOD removal reactor, (b) all of the second return activated sludge flow, and (c) the nitrate recycle flow, and/or a rate of flow of discharge from the first carbonaceous BOD removal reactor to the anammox reactor can be up to 45% of a combined rate of flow of the wastewater inflow and a rate of flow of the first return activated sludge flow from the clarifier to the first carbonaceous BOD removal reactor, and/or a rate of flow of from the one or more second carbonaceous BOD removal reactors to the nitritation reactor can be up to a rate of flow of the NRF plus 55% of a combined rate of flow of the wastewater inflow and a rate of flow of the first return activated sludge flow from the clarifier to the first carbonaceous BOD removal reactor.

BACKGROUND

It is known from US 2013/0327710 to mix the outflow of sequential treatment zones in an anaerobic lagoon or tank design to achieve improved carbon to nitrogen ratio control of the effluent. The anaerobic lagoon or tank produces a blended wastewater or sewage mixture with an adequately high carbon to nitrogen ratio for a downstream activated sludge treatment process to achieve enhanced nitrogen removal by nitrification-denitrification.

Bacteria mediating the direct conversion of nitrite and ammonium into nitrogen gas by the anaerobic ammonium oxidation (anammox) process are used for deammonification of wastewater without the intermediate production of nitrate. However, dissolved oxygen (DO) concentrations of more than 0.2 mg/L are known to inhibit the anammox process.

Significant challenges remain in the treatment of industrial wastewater or municipal sewage based on the variability of pollutant concentrations, volume, and temperature of the influent into a treatment facility.

SUMMARY OF THE DISCLOSURE

Disclosed herein is a process for operating a two-stage or three-stage activated sludge wastewater or sewage treatment system in which a dual or triple RAS flow is provided such that a first RAS flow is conducted from a common downstream final clarifier to the first AS stage with a low flow rate, a second RAS flow is conducted from the final clarifier to the second AS stage with a low flow rate, and an optional third RAS flow is conducted from the clarifier to the third stage anammox reactor.

In particular, a process is disclosed which comprises receiving a wastewater inflow or a sewage inflow in a first stage flow equalization reactor, receiving an outflow from the flow equalization reactor in a second-stage nitritation reactor, receiving an overflow of partially treated wastewater or partially treated sewage from the nitritation reactor in a third-stage anammox reactor, receiving a bypass flow from the flow equalization reactor in the anammox reactor, receiving a mixed liquor flow from the anammox reactor in a clarifier, providing a first return activated sludge flow from the clarifier to the flow equalization reactor ($RAS_1$), the nitritation reactor ($RAS_2$), or to the flow equalization reactor and to the nitritation reactor, and providing a second return activated sludge flow from the clarifier to the anammox reactor ($RAS_3$).

BRIEF DESCRIPTION OF THE DRAWINGS

The disclosure will now be described with reference to the drawings wherein.

DESCRIPTION OF THE BEST AND VARIOUS EMBODIMENTS

The foregoing and other objects, aspects, and advantages of the disclosure will be better understood from the following detailed description of the best and various embodiments. Throughout the various views and illustrative embodiments of the present disclosure, like reference numbers are used to designate like elements.

In a typical embodiment, the mixed liquor flow from the anammox reactor is received in a plurality of clarifiers that are operated in parallel. Throughout this disclosure, a plurality means two or more.

In another typical embodiment, the bypass flow from the flow equalization reactor and the outflow from the nitritation reactor are blended in the anammox reactor. In yet another typical embodiment, the mean cell residence time (MCRT) of the flow equalization reactor, the nitritation reactor or the equalization reactor and the nitritation reactor is adjusted to be of from 2 to 5 days.

In a particular embodiment, the MCRT of the anammox reactor is adjusted to be of from 40 to 60 days. With particularity, the MCRT of the anammox reactor is adjusted to be approximately 50 days. Throughout this disclosure, approximately means that a value can vary by ±10%.

Typically, the outflow from the flow equalization reactor into the nitritation reactor is provided with an average flow rate of from 40% to 50% of an average daily feed forward flow rate. More typically, the average daily flow rate of the outflow is 45% of the average daily feed forward flow rate.

In a typical embodiment, the bypass flow from the flow equalization reactor into the anammox reactor is received with an average flow rate of from 50% to 60% of the average daily feed forward flow rate. In particular, the average daily flow rate of the bypass flow is 55% of the average daily feed forward flow rate.

In a particular embodiment, the flow equalization reactor is operated with a dissolved oxygen concentration of approximately 0.0 mg/L to 0.10 mg/L. In another particular embodiment, the nitritation reactor is operated with a dissolved oxygen concentration of approximately 0.10 mg/L to 0.30 mg/L. In yet another typical embodiment, the anammox reactor is operated with a dissolved oxygen concentration of approximately 0.0 mg/L to 0.10 mg/L.

With particularity, at least one polishing reactor is provided between the anammox reactor and the clarifier. Also with particularity, a plurality of polishing reactors connected in series is provided between the anammox reactor and the clarifier. In a further particular embodiment, a plurality of polishing reactors connected in series followed by a plurality of clarifiers connected in parallel are provided downstream of the anammox reactor.

In a typical embodiment, the polishing reactor removes residual ammonia from the mixed liquor flow by nitrification. In another typical embodiment, the polishing reactor removes residual nitrate nitrogen from the mixed liquor flow by denitrification. In yet another typical embodiment, two polishing reactors are connected in series, wherein the first polishing reactor removes residual ammonia and the second polishing reactor removes residual nitrate nitrogen.

With particularity, the flow rate of the second or third return activated sludge flow from the clarifier to the second AS stage is greater than the flow rate of the first return activated sludge flow to the first AS stage.

In a particular embodiment, the concentration of mixed liquor suspended solids (MLSS) in the flow equalization reactor, the nitritation reactor or in the flow equalization reactor and the nitritation reactor is of from 500 mg/L to 1,500 mg/L. In another particular embodiment, the concentration of MLSS in the anammox reactor is of from 2,000 mg/L to 10,000 mg/L.

In another embodiment, the concentration of MLSS in the first stage is low. In this embodiment, the concentration of MLSS in the second stage is low but can be higher than in the first stage. In this embodiment, the concentration of MLSS in the third stage anammox reactor is higher. This is possible with three separate RAS systems, one for each stage as depicted, for example, in FIG. 7.

In a typical embodiment, the mixed liquor flow is treated in a first clarifier 120A before being received in the anammox reactor. In another typical embodiment, an outflow of the anammox reactor is treated in a second clarifier 120B. In yet another typical embodiment, a nitrite recycle flow 105 is conducted from the nitritation reactor into the flow equalization reactor.

In a particular embodiment, the wastewater inflow is a liquor selected from the group consisting of a digester supernatant, a sludge dewatering filtrate, an influent screened raw sewage, and a primary clarifier effluent, or a mixture thereof. In another particular embodiment, anammox biomass is recycled from the second clarifier 120B to the anammox reactor. In yet another particular embodiment, aerobic ammonium oxidizing biomass is recycled from the first clarifier 120A to at least one of the equalization reactor 100A and the nitritation reactor 100B.

With particularity, an average daily flow rate of the nitrite recycle flow is of from 100% to 1,000% of the average daily mixed liquor flow. Also with particularity, the average daily flow (ADF) rate of the nitrite recycle flow is 200% to 400% of the average daily throughput wastewater flow volume.

In a particular embodiment, the equalization reactor has an average total daily inflow rate, wherein an average daily flow rate of the mixed liquor bypass flow $Q_1$ is of from 50% to 60% of the average total inflow rate, and wherein an average daily flow rate of the wastewater flow $Q_2$ is of from 40% to 50% of the average total inflow rate. In another particular embodiment, the average daily flow rate of the mixed liquor bypass flow $Q_1$ is 55% of the average total inflow rate and the average daily flow rate of the wastewater flow $Q_2$ is 45% of the average total inflow rate. In yet another particular embodiment, the equalization reactor is operated with a dissolved oxygen concentration of approximately 0.0 mg/L.

In a typical embodiment, the aerobic ammonium oxidizing biomass is recycled from clarifier 120A in return activated sludge flow $RAS_{11}$ and/or $RAS_{12}$ with a flow rate of from 50% to 150% of the average daily throughput flow volume. In another typical embodiment, a combined sludge retention time of biomass sludge in the equalization reactor plus nitritation reactor is selected to be approximately 1 to 4 days, more typically about 3 days. In yet another typical embodiment, a sludge retention time of biomass sludge in the anammox reactor is selected to be of from 40 to 60 days, more typically about 50 days.

With particularity, the nitritation reactor is operated with a dissolved oxygen concentration of approximately 0.10 to 0.40 mg/L, more particularly 0.20 mg/L. Also with particularity, the anammox reactor is operated with a dissolved oxygen concentration of from 0.0 mg/L to approximately 0.10 mg/L.

A hypochlorite solution, a hydrogen peroxide solution or peracetic acid solution can be optionally added to the nitritation reactor 100B to inhibit the growth and accumulation of nitrite oxidizing biomass (NOB) and the production of nitrate nitrogen in the first and second stage reactor-clarifier system. Also, surface aeration can be optionally used in the nitritation reactor to reduce the mixed liquor temperature in order to inhibit the growth of nitrite oxidizing bacteria.

DETAILED DESCRIPTION

Figure 1:
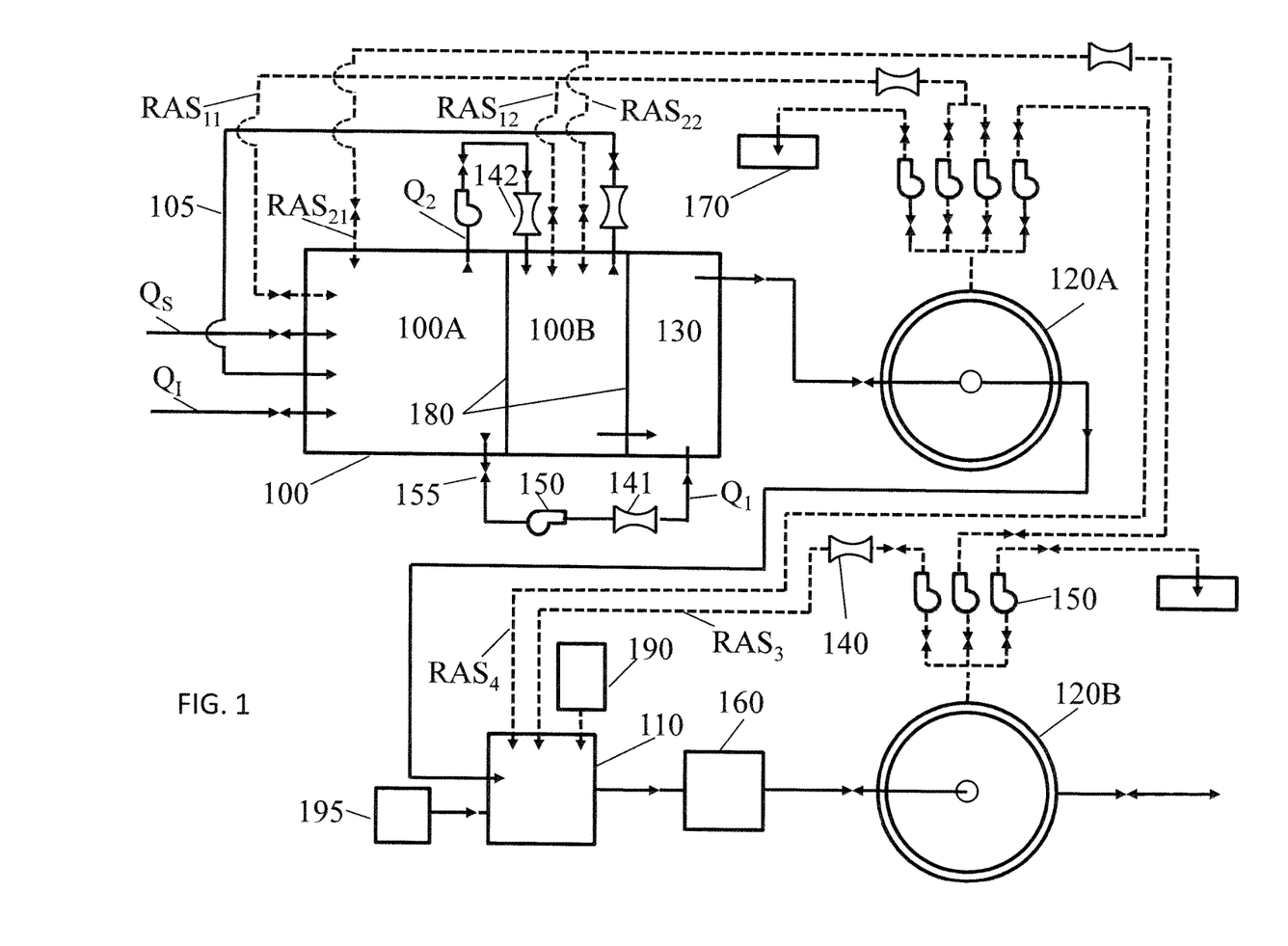
FIG. 1 shows a schematic overview of the treatment process in which a third stage anammox reactor 110 receives a mixture of a wastewater inflow from clarifier 120A.

Turning to the drawings, FIG. 1 shows a wastewater treatment system 100, which is divided into three treatment zones 100A, 100B, and flocculation tank 130 by separator walls 180. The first treatment zone is operated as a flow equalization reactor (EQ reactor) to equalize diurnal flow variations, stormwater flow surges, and spikes in the influent wastewater flow; to mix and blend various influent wastewater sources such as screened and degritted raw sewage $Q_I$, high strength sludge digester process supernatant wastewater $Q_S$, and/or sludge dewatering process filtrate wastewater and filter backwash wastewater. Further, the first treatment zone 100A provides a first stage activated sludge treatment for carbonaceous biological oxygen demand (BOD) removal by anoxic heterotrophic biomass (AHB) using nitrite or nitrate nitrogen contained in mixed liquor of nitrite recycle flow (NiR) 105 recycled from the downstream second stage aerobic nitritation reactor 100B as an oxygen source.

From the equalization reactor 100A, mixed liquor containing partially treated wastewater or sewage is pumped with pump 150 through valve 155 as by-pass flow $Q_1$ to flocculation tank 130, which is operated as a mixer cell. Further, a second flow of partially treated wastewater or sewage $Q_2$ is pumped directly to the nitritation reactor 100B. The flow rates $Q_1$ and $Q_2$ are measured using flow meters 141 and 142, respectively. An overflow 230 of mixed liquor from the nitritation reactor is also received in the flocculation tank 130, which combines and mixes the by-pass mixed liquor flow from the equalization reactor and the mixed liquor overflow from the nitritation reactor. After mixed liquor suspended solids are settled in first clarifier 120A, the clarifier overflow is conducted to anammox reactor 110 for treatment by anammox bacteria. Optionally, two or more clarifiers 120A may be operated in parallel.

From first clarifier 120A one or more return activated sludge (RAS) flows may be provided. In particular, $RAS_{11}$ line returns activated sludge to the equalization reactor 100A and $RAS_{12}$ returns activated sludge to the nitritation reactor 100B. Further, activated sludge can be pumped from the first clarifier 120A through line $RAS_4$ to the anammox reactor 110 and a return activated sludge flow can be provided from second clarifier 120B to anammox reactor 110 using return activated sludge line $RAS_3$. In addition, return activated sludge line $RAS_{21}$ is provided for returning activated sludge from second clarifier 120B to equalization reactor 100A and $RAS_{22}$ is provided for returning activated sludge from second clarifier 120B to nitritation reactor 100B. The flow rate is measured using flow meter 140.

A mixed liquor outflow from anammox reactor 110 is conducted to flocculation tank 160 and subsequently into second clarifier 120B. Optionally, two or more clarifiers 120B may be operated in parallel.

Excess sludge can be collected and discarded using waste activated sludge tank 170. Optionally, a carbon source from carbon source container 190 may be added to anammox reactor 110 to assist in removal of any nitrate nitrogen that might be present in the clarifier 120B overflow wastewater. Typical carbon source solutions are, for example, methanol, high quality waste glycerin, sugar-based waste products, and acetic acid or a mixture thereof.

Anammox reactor 110 can optionally be maintained at a temperature between 20° C. and 30° C. by providing heat using heat source 195. The heat source can be a steam injector, one or more dry heating elements, or a heat exchanger unit through which a mixed liquor flow is recirculated. The equalization reactor 100A is operated at approximately 0.0 (zero) dissolved oxygen (DO) concentration with nitrite recycle influent flow, and, with or without return activated sludge (RAS) influent flow. A continuous mixed liquor recycle flow rate of 100% to 1000% (400% average) designated as the nitrite recycle (NiR) Flow Rate 105 is provided from the nitritation reactor 100B back into the equalization reactor 100A. An RAS rate of 50% to 150% is typically used from the downstream clarifier for the RAS flows $RAS_{11}$ and $RAS_{12}$ to the equalization reactor and/or the nitritation reactor.

Figure 2:
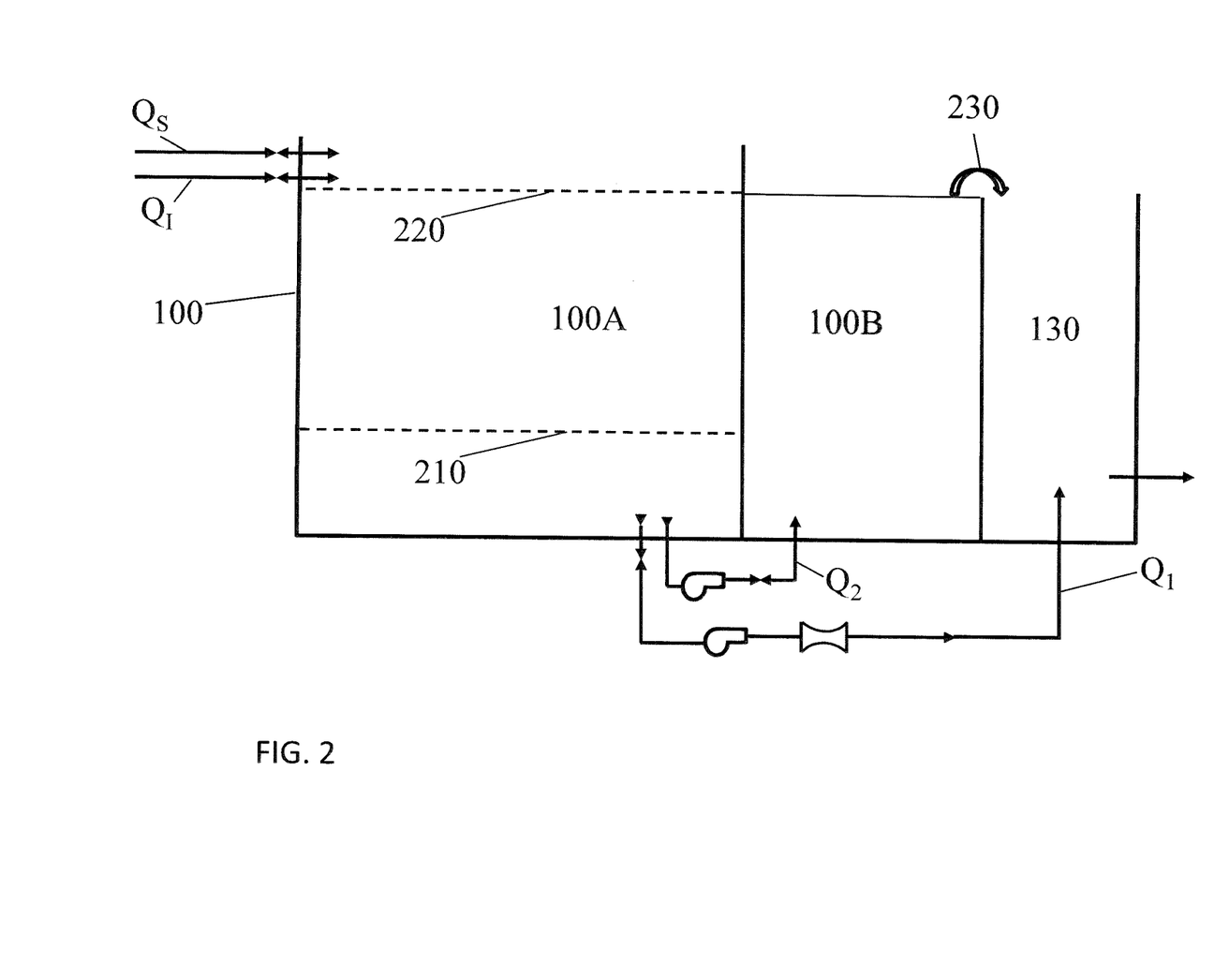
FIG. 2 shows a sideview of equalization reactor 100 with one or more treatment zones wherein a wastewater fill level within the reactor 100 is maintained between low level mark 210 and high level mark 220.

FIG. 2 shows a side view of wastewater treatment system 100. The combined inflow into the equalization reactor 100A is equalized such that a fill height of wastewater or sewage in the reactor is maintained between low level mark 210 and high level mark 220 where the inflow undergoes partial treatment. After the partial treatment, an outflow $Q_2$ is received in nitritation reactor 100B. The flow rates of flows $Q_1$ and $Q_2$ leaving the equalization reactor can be constant or substantially constant. An overflow 230 is collected in flocculation tank 130. Mixed liquor overflow 230 and mixed liquor by-pass flow $Q_1$ are mixed in flocculation tank 130 before being conducted to clarifier 120A for biomass sedimentation.

Figure 3:
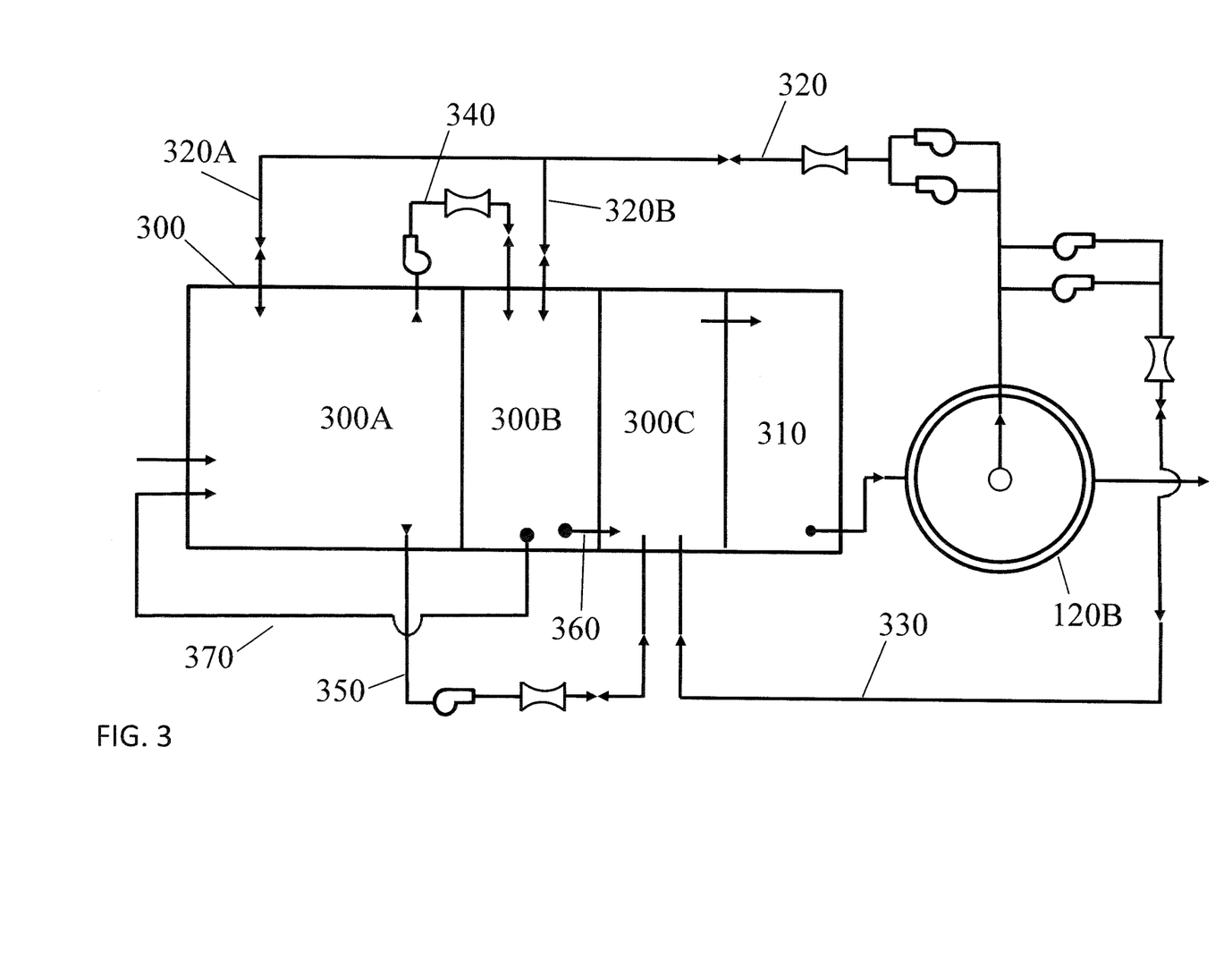
FIG. 3 shows a three-stage RAS wastewater treatment system 300 with a triple RAS flow system for adjusting the return flow rates separately.

FIG. 3 shows a two-stage activated sludge wastewater treatment system 300 with a dual RAS flow system. A first return line 320 returns activated sludge from the clarifier to the first AS stage. In particular, return line 320 provides a RAS flow to the flow equalization reactor 300A via segment 320A and/or the nitritation reactor 300B via segment 320B. Further, a RAS return flow is provided for returning activated sludge from the clarifier to anammox reactor 300C, i.e., the second AS stage, via return line 330. The return flow rates through return lines 320 and 330 is adjusted separately for the first AS stage and the second AS stage.

Figure 4:
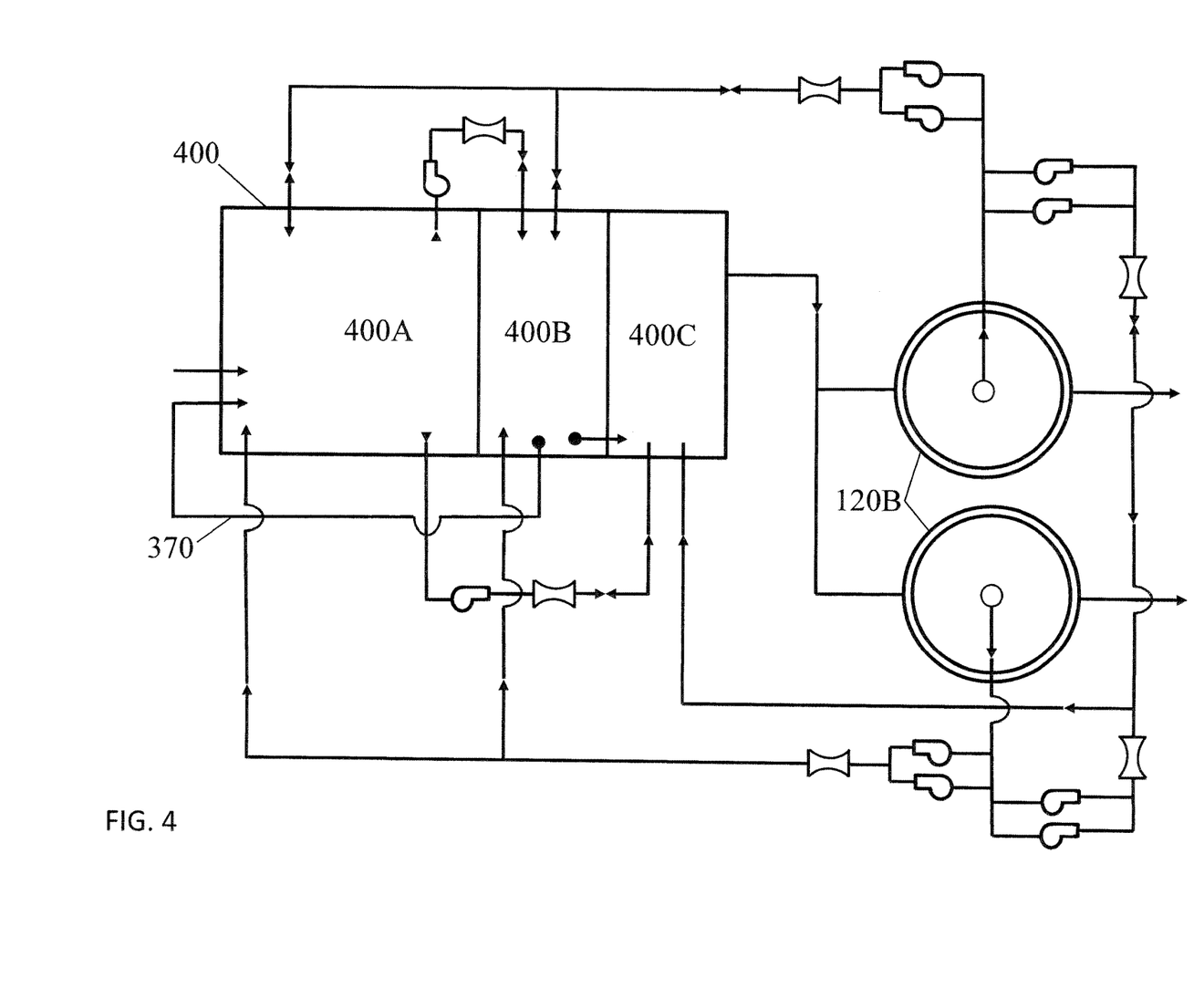
FIG. 4 shows a three-stage RAS wastewater treatment system 400 in which two final clarifiers are connected in parallel; and, FIG. 5 shows a two-stage RAS wastewater treatment system 500 in which two polishing reactors are connected in series upstream of first clarifier 120A.
Figure 5:
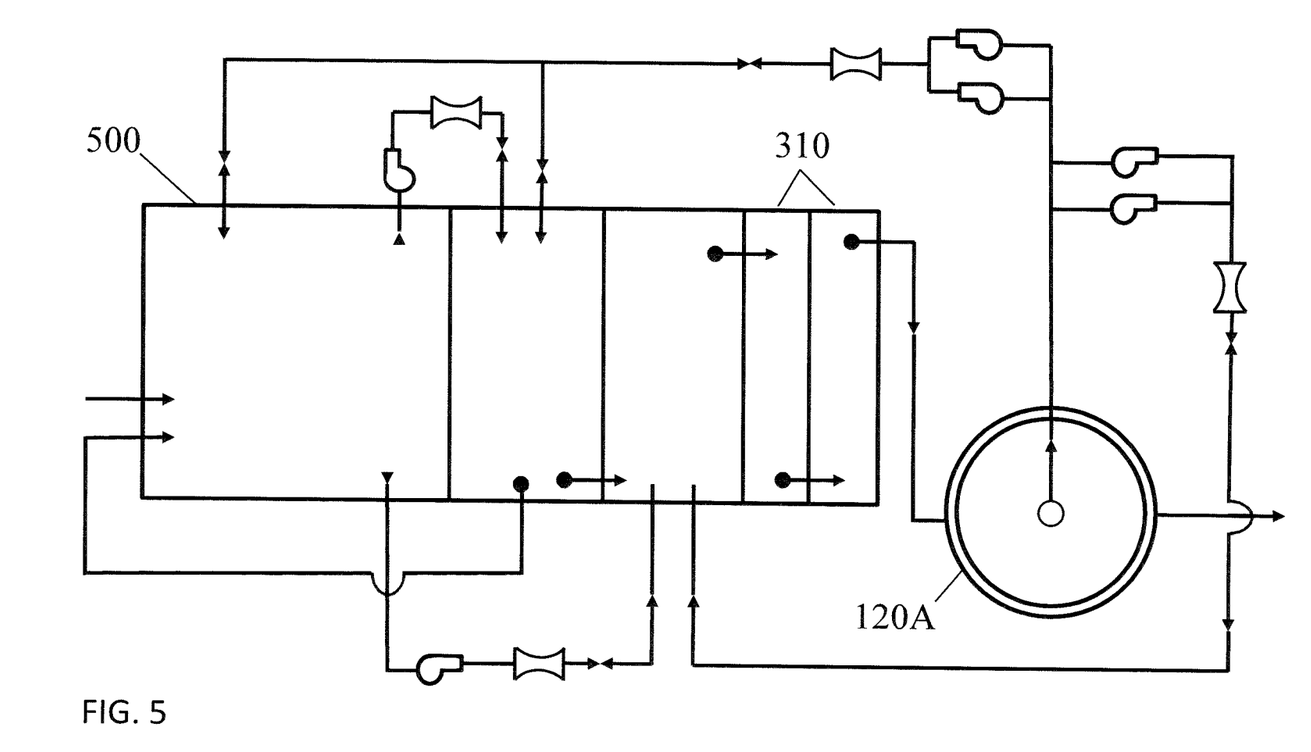

FIG. 4 shows a two-stage AS wastewater treatment system 400 containing an FEB reactor 400A, a nitritation reactor 400B, and an anammox reactor 400C, in which two final clarifiers are connected in parallel; and, FIG. 5 shows a two-stage AS wastewater treatment system 500 in which two polishing reactors 310 are connected in series.

The final activated sludge clarifier 120B in FIG. 3 is common to both AS stages. Further, the clarifier is provided with two segregated return AS sludge (RAS) return lines. A RAS flow with a low flow rate into the first stage results in a low mean cell residence time (MCRT) of activated sludge in the first stage, which comprises the FEB reactor 300A and the nitritation reactor 300B. By contrast, a high return flow rate of activated sludge back into the second stage, which comprises the anammox reactor 300C, results in a high MCRT for the second stage.

Flow equalization basin (FEB) reactor 300A is operated as an anoxic reactor at a very low dissolved oxygen (DO)

concentration of approximately 0.00 mg/L to 0.10 mg/L to achieve carbonaceous BOD removal; conversion of organic nitrogen to ammonia nitrogen; and, denitrification of recycled nitrite or nitrate nitrogen. Nitritation reactor 300B is operated as an aerobic reactor with a slightly higher DO concentration of approximately 0.10 to 0.30 mg/L to achieve oxidation of ammonia nitrogen to nitrite nitrogen by biological nitritation.

The second stage of the two-stage AS system, which comprises anammox reactor 300C, is operated at zero DO or at a very low DO concentration of 0.10 mg/L or less to achieve nitrogen removal by deammonification.

Two wastewater flows are pumped from FEB reactor 300A. The first flow 340 is pumped into nitritation reactor 300B and the second flow 350 is pumped into the influent of anammox reactor 300C, thereby bypassing the nitritation reactor. Approximately 55% of the feed forward throughput daily flow volume is pumped from FEB anoxic reactor 300A directly into the downstream anammox reactor 300C and approximately 45% of the throughput flow volume is pumped from FEB anoxic reactor into downstream nitritation reactor 300B. Partially treated wastewater 360 overflows a weir and is conducted by gravity into the downstream anammox reactor 300C. The two flows 340 and 350 pumped from the FEB reactor into the nitritation reactor and the pumped flow bypassing reactor 300B are discharged into and blended in the downstream anammox reactor. Typically, a 40% to 50% wastewater flow volume, more typically a 45% wastewater flow volume, is pumped from the FEB reactor into the nitritation reactor as outflow 340.

Subsequently, partially treated wastewater or sewage flows over from the nitritation reactor into the anammox reactor as overflow 360 with a similar flow rate to the outflow 340. Also typically, 50% to 60% wastewater flow volume, more typically 55% wastewater flow volume, is pumped from the nitritation reactor into the inlet of the anammox reactor as bypass flow 350. Overflow 360 and bypass flow 350 are blended in the anammox reactor.

Optionally, mixed liquor can be recycled by gravity flow from the nitritation reactor 300B back into the FEB Reactor 300A through return line 370 to achieve nitrate/nitrite removal by biological denitrification in the FEB reactor. The purpose of this optional recycle flow 370 is to prevent excess nitrite nitrogen concentration accumulation in the mixed liquor overflow from nitritation reactor 300B into anammox reactor 300C because high nitrite nitrogen concentrations can be toxic to anammox bacteria. If a recycle flow 370 is in operation, then this flow rate and volume are added to the total flow rate pumped out of the FEB Reactor in flows 340 and 350 with flow 340 being approximately 45% of the total and flow 350 being approximately 55% of the total flow.

The wastewater flow pumped from the FEB anoxic reactor contains a significantly reduced BOD concentration and a high ammonia nitrogen concentration, while the flow discharged by gravity from the aerobic nitritation reactor contains a low BOD concentration, a reduced ammonia nitrogen concentration and an increased nitrite nitrogen concentration. FEB reactor 300A is controlled and operated to provide for the growth of anoxic heterotrophic carbonaceous bacteria (AHB) to achieve substantial BOD removal, conversion of organic nitrogen (ON) to ammonia nitrogen ($NH_3$-N) and denitrification of nitrite or nitrate nitrogen recycled from nitritation reactor 300B. Further, reactor 300B is controlled and operated to provide for the growth of ammonia oxidizing bacteria (AOB) to oxidize ammonia nitrogen to nitrite nitrogen but not to nitrate nitrogen. Reactor 300B is controlled and operated to minimize the growth of nitrite oxidizing bacteria (NOB), which would oxidize nitrite to nitrate nitrogen. Thus, the treatment process goal of the nitritation reactor is to achieve nitritation (oxidation of ammonia to nitrite) and not nitrification (oxidation of ammonia to nitrate). The treatment process goal of FEB anoxic reactor 300A is to achieve BOD removal without ammonia nitrogen removal. The treatment goal of reactor 300B is to convert ammonia nitrogen to nitrite nitrogen. The treatment goal of reactor 300C is to convert a blend of ammonia nitrogen and nitrite nitrogen to nitrogen gas.

The partially treated wastewater discharged into the anammox reactor 300C is a blend of approximately 55% wastewater volume with low BOD concentration, elevated ammonia nitrogen concentration and zero or very low nitrite and nitrate nitrogen concentration, and, 45% wastewater volume with low BOD concentration, elevated nitrite nitrogen concentration and low ammonia nitrogen concentration. Choosing this ratio of ammonia nitrogen and nitrite nitrogen optimizes the growth of anammox bacteria in the anammox reactor to achieve biological deammonification of ammonia nitrogen and total nitrogen removal.

Anammox reactor 300C is typically controlled and operated with a zero or very low DO concentration of less than 0.10 mg/L. Other process parameters such as wastewater temperature, pH, etc. are controlled in the anammox reactor to maximize the quantity and accumulation of anammox bacteria therein.

Mixed liquor flows over from the anammox reactor into either a downstream final clarifier or into one or more downstream polishing reactors 310 for nitrification and denitrification of any residual ammonia nitrogen and/or nitrate nitrogen in the anammox reactor effluent before flowing into the final clarifier.

Two separate RAS recycle flows are pumped from the final clarifier 120B shown in FIG. 3 or clarifiers 120B connected in parallel shown in FIG. 4. The first RAS flow 320 is pumped from the clarifier back into FEB reactor 300A and/or into nitritation reactor 300B. Accordingly, FEB reactor 300A and nitritation reactor 300B are operated as a first stage low MCRT activated sludge treatment system. The second RAS flow 330 is pumped from the clarifier into the anammox reactor 300C, which is operated as a second stage high MCRT activated sludge treatment system.

To achieve operating conditions with a low MCRT for the first AS stage, typically of from 2 to 5 days, a low RAS flow pumping rate is provided for recycling activated sludge from the final clarifier back into the FEB reactor and/or the nitritation reactor. By contrast, the second AS stage is operated with a high MCRT, typically 50 days. Therefore, the RAS return flow to anammox reactor 300C is provided with a high RAS flow pumping rate. In this manner, the segregated low and high RAS rates can be used to recycle most of the settled mixed liquor biomass solids from the clarifier into the anammox reactor with a low amount of settled biomass solids recycled from the clarifier into FEB reactor 300A or nitritation reactor 300B. This segregated RAS process results in a low MLSS concentration of about 500 mg/L to 1,500 mg/L being maintained in the first AS stage and a high MLSS concentration of about 2,000 mg/L to 6,000 mg/L being maintained in the second AS stage.

If the anammox reactor effluent still contains ammonia nitrogen, TKN, nitrite or nitrate nitrogen concentrations that must be further treated, for example to meet permit levels, then the anammox reactor effluent mixed liquor effluent flows over into downstream nitrification and denitrification polishing reactors 310 prior to flowing into the final clarifier or into the final clarifiers. In the system in FIG. 5, two polishing reactors 310 are connected in series, wherein the first polishing reactor is a nitrification polishing reactor and the second polishing reactor is a denitrification polishing reactor.

As noted above, the FEB reactor provides flow equalization of the wastewater or sewage influent. In another embodiment, the FEB can be split into multiple FEB as in FIG. 6. The multiple FEB can be connected in series. In other words, FEB 300A can be split or divided by a dividing wall into two or more sections.

Figure 6:
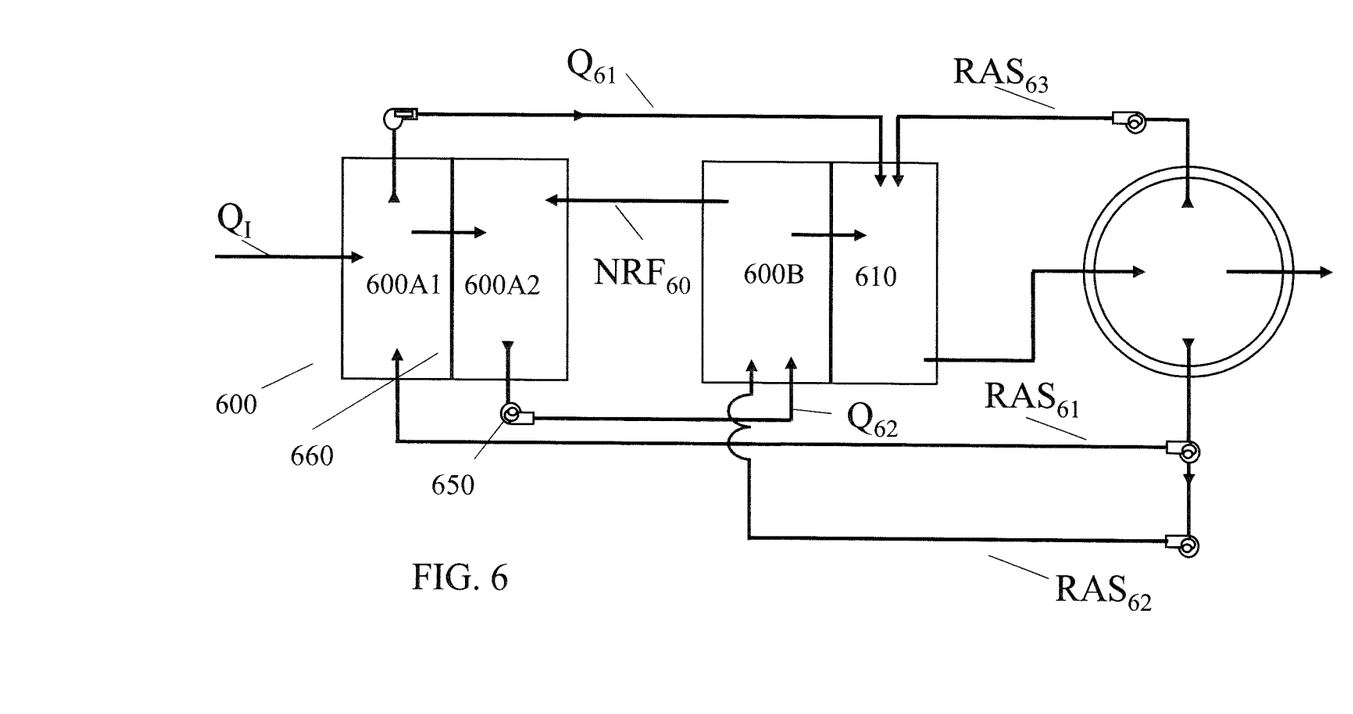
FIG. 6 shows a two-stage RAS wastewater treatment system 600 in which two flow equalization basins (600A1 and 600A2) are connected in series upstream of a nitritation reactor 600B and anammox reactor 600C.

In FIG. 6, the one or more partitioned FEB are illustrated as 600A1 and 600A2, in series. Additional partitions 660 may be employed. In FIG. 6 two FEBs are provided (600A1 and 600A2) divided by partition 660 for illustrative purposes. FEBs 600A1 and 600A2 otherwise function as in FEB 100A and/or FEB 300A, as described above. Terminal FEB 600A2 feeds into nitritation reactor 600B, via pump 650, where the nitritation reactor 600B functions similar to nitritation reactor 100B or 300B, as described above. Nitritation reactor 600B feeds into anammox reactor 610. Anammox reactor 610 functions similar to anammox reactors 110 and 310. Anammox reactor 610 feeds into the clarifier represented as a circle in FIG. 6. Three RAS lines feed AS from the clarifier through lines $RAS_{63}$, $RAS_{62}$, and $RAS_{61}$, via pumps dedicated to each RAS line, to anammox reactor 610, nitritation reactor 600B, and primary FEB 600A1, respectively. Further, an optional nitrate recycle flow ($NRF_{60}$) is depicted in FIG. 6 allowing for nitrate flow from nitritation reactor 600B to terminal FEB 600A2. Primary FEB 600A1 outflow $Q_{61}$ is provided by dedicated pump to bring water from 600A1 to anammox reactor 610. Additionally, terminal FEB 600A2 outflow $Q_{63}$ is provided by dedicated pump to bring water from terminal FEB 600A2 to nitritation reactor 600B.

In such an embodiment, the last section of the multi-FEB system is the only section that receives the optional nitrate recycle flow, i.e. through $NRF_{60}$ as in FIG. 6, if such a recycle flow is employed in the wastewater treatment system design and operation.

In one embodiment, approximately 45% of the total inflow into 600A1 is pumped at a relatively constant output flow of $0.45 \times (Q_I + RAS_{61})$ into downstream anammox reactor 610. This inflow contains an elevated ammonia nitrogen concentration that is approximately equal to the raw wastewater ammonia concentration diluted by the $RAS_{61}$ flow volume. On the other hand, the outlet flow of 600B contains a low or significantly reduced ammonia concentration of approximately 1.0 mg/l, but can be anywhere from 0.1 to 2.0 mg/l ammonia.

In another embodiment, approximately 55% of the total inflow into 600A1 occurs by gravity through openings in the partition wall 660 between 600A1 and 600A2, into 600A2 to mix with NRF from 600B into 600A2. The total inflow into 600A2 is pumped at a relatively constant output flow of $0.55 \times (Q_I + RAS_{61}) + NRF_{60}$ into downstream nitritation reactor 600B in order to ensure the influent wastewater ammonia load goes approximately 55% to nitritation reactor 600B and 45% to anammox reactor #3. Flow from the $NRF_{60}$ can range from about 0 to about 4 times the flow of $Q_I$. It is noted that in this embodiment, $NRF_{60}$ does not flow into 600A1. As in FIG. 1, various influent wastewater sources such as screened and degritted raw sewage $Q_I$ enters the system at primary FEB 600A1. While $Q_{61}$ and $Q_{62}$ provide flow to anammox reactor 610 and nitritation reactor 600B, respectively, in the embodiment depicted in FIG. 6 no NRF is supplied to primary FEB 600A1. Thus, FEB 600A1 receives influent wastewater flow from $Q_I$ and RAS flow from $RAS_{61}$, but receives no NRF source. NRF is only supplied to one or more downstream FEB, such as FEB 600A2.

In a further embodiment, in FIG. 6, FEB 600A1 and 600A2 function as a split first stage carbonaceous biological oxygen demand (BOD) removal reactor. In this embodiment, FEB 600A1 and 600A2 do not provide flow equalization. Instead, the BOD removal reactor discharges flow $Q_{61}$ and $Q_{62}$ as split gravity overflows. In this embodiment, the flow into 600A2 being $0.55 \times (Q_I + RAS_{61})$ and the flow into anammox reactor 610 through discharge line $Q_{61}$ being $0.45 \times (Q_I + RAS_{61})$. In this embodiment, the flow of $Q_{62}$ into nitritation reactor 600B from terminal BOD removal reactor 600A2 is $0.55 \times (Q_I + RAS_{61}) + NRF_{60}$. In other words, the embodiments reflected in FIG. 6 can be optionally employed without 600A1 and 600A2 functioning as flow equilibration reactors and instead being operated as anoxic reactors to achieve carbonaceous BOD removal, conversion of organic nitrogen to ammonia nitrogen, and denitrification of recycle nitrite or nitrate nitrogen.

Figure 7:
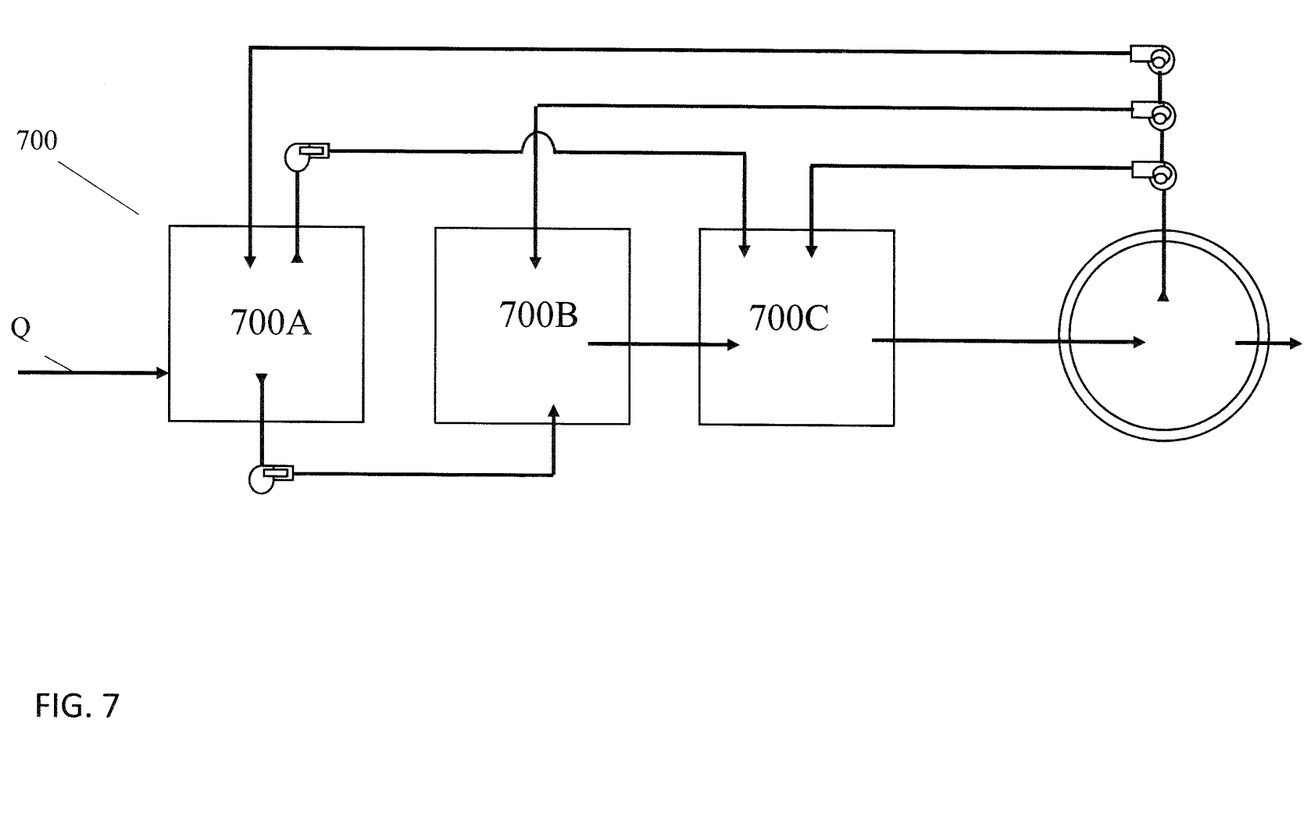
FIG. 7 shows a three-stage RAS wastewater treatment system 700 in which the flow equalization basin 700A (first stage) is connected in series upstream of a nitritation reactor 700B (second stage) and anammox reactor 700C (third stage).

Another embodiment of the disclosed process for treating wastewater or sewage is depicted in FIG. 7. In this embodiment, a wastewater inflow or a sewage inflow is received in a first carbonaceous biological oxygen demand (BOD) removal reactor, an outflow from the first carbonaceous BOD removal reactor is received in one or more second carbonaceous BOD removal reactors, an outflow from the one or more second carbonaceous BOD removal reactors is received by a nitritation reactor, and an overflow of partially treated wastewater or partially treated sewage from the nitritation reactor is received by an anammox reactor. Further, a bypass flow from the first carbonaceous BOD removal reactor and/or the one or more second carbonaceous BOD removal reactors is received by the anammox reactor. Additionally in this embodiment, a mixed liquor flow from the anammox reactor is received by a common clarifier.

In this alternative embodiment depicted in FIG. 7, there is provided a first, second, and third return activated sludge (RAS) flow. The first RAS runs from the clarifier to the first flow carbonaceous ROD removal reactor. The second RAS runs from the clarifier to the nitritation reactor. A third RAS runs from the clarifier to the anammox reactor.

In this alternative embodiment, the first carbonaceous BOD removal reactor and the one or more second carbonaceous BOD removal reactors are each separated by a partition wall, comprising one or more openings providing fluid communication therethrough.

Uniquely to the system and method disclosed in FIGS. 1 and 2, the equalization reactor 100A is also operated to accurately divide the partially treated reactor effluent mixed liquor into a first flow portion $Q_2$, which is pumped constantly into the downstream second stage aerobic nitritation reactor, and a second flow portion $Q_1$, which by-passes the second stage aerobic reactor, and, is pumped constantly into a first stage clarifier 120A. A first portion flow rate $Q_2$ of approximately 40% to 50%, in particular 45%, of the total average daily influent wastewater flow volume or flow rate of sewage or wastewater plus sludge treatment supernatant and filtrate, plus the RAS flow rate, plus the nitrite recycle flow rate is constantly pumped from the EQ reactor into the downstream second stage aerobic nitritation reactor 100B for treatment by anammox bacteria. A second portion flow rate $Q_1$ of approximately 50% to 60%, in particular 55%, of the total average daily influent wastewater flow volume plus recycle flow is pumped from the equalization reactor directly into the first stage clarifier influent mixed liquor flow, thereby by-passing the second stage aerobic nitration reactor 100B.

Using this equalization reactor effluent flow splitting process, the clarified and partially treated influent wastewater that flows into the third stage reactor 110 is a mixture of an approximately 45% first portion wastewater flow with reduced ammonia concentration, increased nitrite nitrogen concentration, low nitrate nitrogen concentration, and further reduced carbonaceous BOD concentration; and, an approximately 55% second portion wastewater flow portion with high influent ammonia concentration, low nitrite and nitrate concentration, and reduced carbonaceous BOD concentration.

The first stage clarifier effluent is a blend of partially treated wastewater that has a low BOD concentration, increased nitrite nitrogen concentration, and reduced ammonia nitrogen concentration. The BOD, ammonia nitrogen, and nitrite nitrogen concentrations in the first stage clarifier effluent are controlled by the operation of the equalization reactor process flow splitting method plus nitrite recycle flow 105 from the downstream nitration reactor back into the equalization reactor 100A. The concentrations of BOD, ammonia nitrogen, and nitrite nitrogen in the blended first stage clarifier effluent are controlled to promote and optimize the growth and accumulation of anaerobic, autotrophic ammonia oxidizing anammox biomass in the third stage anammox reactor 110 in which these autotrophic bacteria will use nitrite nitrogen as an inorganic food substrate to convert nitrite nitrogen to nitrogen gas. In a particular embodiment, the process is conducted without supplemental carbon source dosage 190.

In the three stage activated sludge process with intermediate (first stage) and final (second stage) clarification steps, the first stage equalization reactor is typically operated at zero dissolved oxygen (DO) concentration; the second stage aerobic reactor at low DO concentration of approximately 0.20 mg/L; and the third stage anammox reactor at low DO concentration of 0.0 to 0.20 mg/L. Biomass solids that are produced in the first and second stage reactors are settled in the first stage clarifier(s) and recycled by pumping back into the first stage equalization reactor or optionally into the second stage aerobic nitration reactor 100B. Biomass solids that are produced in the third stage reactor 110 are settled in the second stage clarifier 120B and recycled by pumping the solids back into the third stage reactor 110. Thereby, separate biomass sludges each having a different and independent Sludge Retention Time (SRT) and mean cell residence time (MCRT) can be produced and maintained in the first and second stage reactor-clarifier system vs. the third stage reactor-clarifier system.

Maintaining independent SRT and MCRT control in the first and second stage reactor-clarifier system, and the third stage reactor-clarifier system, allows for producing, maintaining, and controlling the growth and population of anaerobic autotrophic ammonia oxidizing anammox bacteria, which accomplish the deammonification process in the third stage anammox reactor 110. The deammonification process involves two process steps including the nitration of ammonia by aerobic AOB in the first and second stage reactor-clarifier system followed by the anaerobic oxidation of residual ammonia to nitrogen gas by anaerobic AOB in the third stage reactor-clarifier system.

Specifically, the two process steps can be represented by the following reaction equations:

$$2NH_4^+ + 3O_2 \rightarrow 2NO_2^- + 4H^+ + 2H_2O, \quad \text{(I) and}$$

$$NH_4^+ + NO_2^- \rightarrow N_2 + 2H_2O. \quad \text{(II)}$$

This deammonification process significantly reduces the operating costs for oxygen transfer power and for supplemental carbon source chemical dosage required to achieve total nitrogen removal.

Short SRT and MCRT times of about 1 to 4 days, in particular approximately 3 days, are preferred for the growth of anoxic heterotrophic biomass (AHB) and aerobic (AOB) to achieve BOD removal and nitration in the first and second stage reactor-clarifier system, while much longer SRT and MCRT times of about 40 to 60 days, in particular approximately 50 days, are preferred for the growth of anaerobic, anammox AOB to achieve nitrite and ammonia removal in the third stage reactor-clarifier system.

An average nitrite recycle (NiR) flow rate 105 of 200% to 400% of the average daily flow (ADF) is provided from nitration reactor 100B back into equalization reactor 100A, which removes approximately 80% of any nitrate nitrogen unintentionally produced in nitration reactor 100B via denitrification by AHB in flow equalization reactor 100A. The NiR also recycles approximately 80% of the nitrite nitrogen intentionally produced in nitration reactor 100B, which is also removed via denitrification by AHB in equalization reactor 100A and thereby assists in preventing nitrite accumulation in nitration reactor 100B because nitrite is a toxic compound for anammox bacteria when present in excess.

An optional sludge recycle line (RAS$_4$) can be supplied for clarifier 120A to provide the capability of very accurately controlling the feed rate of AHB, which is contained in clarifier 120A mixed liquor underflow, into the anammox reactor 110 influent flow. Thereby, additional nitrite or nitrate nitrogen removal by denitrification in anammox reactor 110 is made possible. In particular, the RAS$_4$ flow into anammox reactor 110 can be used to achieve additional denitrification by AHB in anammox reactor 110, if desired for the total nitrite or nitrate removal, without over-populating the mixed liquor maintained in anammox reactor 110 with AHB and causing AHB to outcompete the anammox organisms.

Surface aeration can be optionally used in nitration reactor 100B to reduce the mixed liquor temperature and thereby repress nitrite oxidizing biomass (NOB) in the nitration reactor.

The disclosed process uses a flow equalization reactor in a multi-stage activated sludge process in which an anammox biomass population is maintained in a third stage reactor-clarifier system to achieve biological nitrogen removal with significantly reduced process requirements for oxygen transfer and supplemental carbon source chemical dosage.

The embodiments described hereinabove are further intended to explain best modes known of practicing the disclosure and to enable others skilled in the art to utilize the disclosure in such, or other, embodiments and with the various modifications required by the particular applications or uses. Accordingly, the description is not intended to limit it to the form disclosed herein. Also, it is intended that the appended claims be construed to include alternative embodiments.

The foregoing description of the disclosure illustrates and describes the present disclosure. Additionally, the disclosure shows and describes only the preferred embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purpose, as if each individual publication, patent or patent application were specifically and individually indicated to be incorporated by reference. In the case of inconsistencies, the present disclosure will prevail.

What is claimed is:

1. A process for treating wastewater or sewage comprising:
   receiving a wastewater inflow or a sewage inflow in a first reactor;
   receiving an outflow from the first reactor to one or more second reactors;
   receiving an outflow from the one or more second reactors in a nitritation reactor;
   receiving an overflow of partially treated wastewater or partially treated sewage from the nitritation reactor in an anammox reactor;
   receiving a bypass flow from the first reactor and/or the one or more second reactors in the anammox reactor;
   receiving a mixed liquor flow from the anammox reactor in a clarifier;
   providing a first return activated sludge flow from the clarifier to the first reactor;
   providing a second return activated sludge from the clarifier to the nitritation reactor; and,
   providing a third return activated sludge flow from the clarifier to the anammox reactor,
   wherein the first reactor and the one or more second reactors are each separated by a partition wall, and
   wherein the partition wall(s) comprise one or more openings providing fluid communication therethrough.

2. The process according to claim 1, further comprising:
   receiving the mixed liquor flow from the anammox reactor in a plurality of clarifiers connected in parallel.

3. The process according to claim 1, further comprising:
   blending the overflow from the nitritation reactor and the bypass flow from the first flow reactor in the anammox reactor.

4. The process according to claim 1, further comprising:
   adjusting a mean cell residence time (MCRT) of the first reactor, the one or more second reactors, the nitritation reactor, or the one or more second reactors and the nitritation reactor, to be of from 2 to 5 days.

5. The process according to claim 1, further comprising:
   adjusting the MCRT of the anammox reactor to be at least 40 days.

6. The process according to claim 5, wherein the MCRT of the anammox reactor is adjusted to be at least 50 days.

7. The process according to claim 1, further comprising:
   receiving the outflow from the first reactor or the one or more second reactors in the nitritation reactor with an average flow rate of from 40% to 50% of an average daily feed forward flow rate.

8. The process according to claim 7,
   wherein the average daily flow rate of the outflow is 45% of the average daily feed forward flow rate.

9. The process according to claim 1, further comprising:
   receiving the bypass flow from the first reactor in the anammox reactor with an average flow rate of from 50% to 60% of an average daily feed forward flow rate.

10. The process according to claim 9,
    wherein the average daily flow rate of the bypass flow is 55% of the average daily feed forward flow rate.

11. The process according to claim 1, further comprising:
    operating the first reactor with a dissolved oxygen concentration of approximately 0.0 mg/L to 0.50 mg/L.

12. The process according to claim 1, further comprising:
    operating the nitritation reactor with a dissolved oxygen concentration of approximately 0.10 mg/L to 0.50 mg/L.

13. The process according to claim 1, further comprising:
    operating the anammox reactor with a dissolved oxygen concentration of approximately 0.0 mg/L to 0.10 mg/L.

14. The process according to claim 1, further comprising:
    providing at least one polishing reactor between the anammox reactor and the clarifier.

15. The process according to claim 14, further comprising:
    providing a plurality of polishing reactors connected in series.

16. The process according to claim 14, wherein the at least one polishing reactor removes residual ammonia from the mixed liquor flow by nitrification.

17. The process according to claim 14, wherein the at least one polishing reactor removes residual nitrite and nitrate nitrogen from the mixed liquor flow by denitrification.

18. The process according to claim 1, wherein a flow rate of the second return activated sludge flow is greater than a flow rate of the first return activated sludge flow, and/or wherein the flow rate of the third return activated sludge is greater than the second return activated sludge flow.

19. The process according to claim 1, wherein a concentration of mixed liquor suspended solids (MLSS) in the first reactor, or the one or more second reactor(s), the nitritation reactor or in the first reactor and the nitritation reactor is of from 500 mg/L to 2,500 mg/L.

20. The process according to claim 1, wherein a concentration of mixed liquor suspended solids (MLSS) in the anammox reactor is of from 2,000 mg/L to 10,000 mg/L.

21. The process according to claim 1, wherein 45% of the sum of the wastewater inflow and return activated sludge inflow into the first reactor is pumped out of the first reactor into the anammox reactor.

22. The process according to claim 1, wherein 55% of the sum total of the wastewater inflow and return activated sludge inflow into the first reactor is received by the one or more second reactors by gravity through the one or more openings in the partition wall(s).

23. The process according to claim 1, further comprising receiving an inflow to the nitritation reactor from one or more second reactors.

24. The process according to claim 23, wherein the sum total of the inflow from the first reactor and the nitritation reactor to the one or more second reactor(s) flows by gravity from the one or more second reactor(s) at a constant rate of 55% into the nitritation reactor.

25. The process according to claim 23, wherein a recycle flow rate from the nitritation reactor into the one or more second reactor(s) ranges from zero to four times the wastewater inflow to the first reactor.

26. The process according to claim 20, wherein the concentration of MLSS in the first reactor is 500 to 1500 mg/L, and/or the concentration of MLSS in the one or more second reactors is 1000 to 2500 mg/L.

27. The process according to claim 20, wherein the first reactor is an equalization reactor or a carbonaceous biological oxygen demand (BOD) removal reactor.

28. The process according to claim 1, wherein when the one or more second reactors are one or more flow equalization reactors, then the first reactor is not a flow equalization reactor, and wherein when the first reactor is a flow equalization reactor, then the one or more second reactors are one or more flow equalization reactors.

29. A process for treating wastewater or sewage comprising:
receiving a wastewater inflow or a sewage inflow in a first carbonaceous biological oxygen demand (BOD) removal reactor;
receiving an outflow from the first carbonaceous BOD removal reactor to one or more second carbonaceous BOD removal reactors;
receiving an outflow from the one or more second carbonaceous BOD removal reactors in a nitritation reactor;
receiving an overflow of partially treated wastewater or partially treated sewage from the nitritation reactor in an anammox reactor;
receiving a bypass flow from the first carbonaceous BOD removal reactor and/or the one or more second carbonaceous BOD removal reactors in the anammox reactor;
receiving a mixed liquor flow from the anammox reactor in a clarifier;
providing a first return activated sludge flow from the clarifier to the first flow carbonaceous BOD removal reactor;
providing a second return activated sludge from the clarifier to the nitritation reactor; and,
providing a third return activated sludge flow from the clarifier to the anammox reactor,
wherein the first carbonaceous BOD removal reactor and the one or more second carbonaceous BOD removal reactors are each separated by a partition wall, and
wherein the partition wall(s) comprise one or more openings providing fluid communication therethrough.

30. The process according to claim 29, further comprising receiving a nitrate recycle flow (NRF) from the nitritation reactor to the one or more second carbonaceous BOD removal reactors.

31. The process according to claim 29, wherein the first and the one or more second carbonaceous BOD removal reactors function as a split first stage carbonaceous BOD removal reactor.

32. The process according to claim 30, wherein a rate of flow of discharge from the first carbonaceous BOD removal reactor to the one or more second carbonaceous BOD removal reactor(s) is a sum total of: (a) up to 55% of a combined rate of flow of the wastewater inflow and a rate of flow of the first return activated sludge flow from the clarifier to the first carbonaceous BOD removal reactor, (b) all of the second return activated sludge flow, and (c) the nitrate recycle flow.

33. The process according to claim 29, wherein a rate of flow of discharge from the first carbonaceous BOD removal reactor to the anammox reactor is up to 45% of a combined rate of flow of the wastewater inflow and a rate of flow of the first return activated sludge flow from the clarifier to the first carbonaceous BOD removal reactor.

34. The process according to claim 27, wherein a rate of flow of from the one or more second carbonaceous BOD removal reactors to the nitritation reactor is up to a rate of flow of the NRF plus 55% of a combined rate of flow of the wastewater inflow and a rate of flow of the first return activated sludge flow from the clarifier to the first carbonaceous BOD removal reactor.

* * * * *

UNITED STATES PATENT AND TRADEMARK OFFICE
CERTIFICATE OF CORRECTION

| | | |
|---|---|---|
| PATENT NO. | : 10,351,457 B2 | Page 1 of 1 |
| APPLICATION NO. | : 15/601678 | |
| DATED | : July 16, 2019 | |
| INVENTOR(S) | : John H. Reid | |

It is certified that error appears in the above-identified patent and that said Letters Patent is hereby corrected as shown below:

In the Specification

In Column 1:
Line 9: delete "14/642,3691" and insert -- 14/642,369 -- therefor.

In Column 3:
Line 30: delete "t-herethrough" and insert -- therethrough -- therefor.

In Column 9:
Line 24: delete "anammox reactor 3000" and insert -- anammox reactor 300C -- therefor.

In Column 12:
Line 41: delete "ROD" and insert -- BOD -- therefor.

Signed and Sealed this
Seventh Day of April, 2020

Andrei Iancu
*Director of the United States Patent and Trademark Office*